(12) United States Patent
Choi

(10) Patent No.: US 11,370,137 B2
(45) Date of Patent: Jun. 28, 2022

(54) CARRIAGE FOR PIPE MACHINING

(71) Applicant: DCSENG CO., LTD., Chungcheongbuk-do (KR)

(72) Inventor: Insung Choi, Daejeon (KR)

(73) Assignee: DCSENG CO., LTD., Chungcheongbuk-Do (KR)

( * ) Notice: Subject to any disclaimer, the term of this patent is extended or adjusted under 35 U.S.C. 154(b) by 29 days.

(21) Appl. No.: 16/929,471

(22) Filed: Jul. 15, 2020

(65) Prior Publication Data
US 2021/0078192 A1 Mar. 18, 2021

(30) Foreign Application Priority Data
Sep. 16, 2019 (KR) .......................... 10-2019-0113548

(51) Int. Cl.
B23B 3/22 (2006.01)
B26D 3/16 (2006.01)
B26D 7/26 (2006.01)

(52) U.S. Cl.
CPC .................. *B26D 3/16* (2013.01); *B23B 3/22* (2013.01); *B26D 7/26* (2013.01); *B26D 2007/2657* (2013.01)

(58) Field of Classification Search
CPC ........ B23K 37/02; B23K 37/053; B23B 5/08; B23B 2215/72
See application file for complete search history.

(56) References Cited

U.S. PATENT DOCUMENTS

| 2,847,558 | A | * | 8/1958 | Mosny | .................. | B23K 37/02 |
| | | | | | | 219/124.1 |
| 4,328,412 | A | * | 5/1982 | Watanabe | .............. | B23K 37/02 |
| | | | | | | 219/121.11 |
| 9,731,363 | B2 | | 8/2017 | Kremsler et al. | | |

FOREIGN PATENT DOCUMENTS

| EP | 3053684 A1 | 8/2016 |
| JP | 09277091 A | 10/1997 |
| JP | 2000005897 A | 1/2000 |
| JP | 2002178214 A | 6/2002 |

(Continued)

OTHER PUBLICATIONS

Extended European Search Report issued in European Application No. 20 185.674.7, dated Jan. 19, 2021, 8 pages.

(Continued)

*Primary Examiner* — Alan Snyder
(74) *Attorney, Agent, or Firm* — RatnerPrestia

(57) ABSTRACT

A pipe machining carriage, including a carriage configured to travel along an outer circumference of a pipe, and a chain coupled to both ends of the carriage wraps around the outer surface of the pipe. The carriage and the chain precisely move along the outer surface of the pipe. The disclosure may provide a carriage that performs machining with high accuracy by preventing the carriage from deviating from the original mounted position by moving the chain along with movement of the carriage. The disclosure may also provide a carriage mounted stably on the outer circumferential surface of the pipe to machine the pipe, regardless of pipe diameter, by adjusting a distance between the carriage drive wheels. The disclosure may prevent the carriage from slipping by mounting a front wheel and a rear wheel to the same drive shaft so the front and rear wheels rotate simultaneously in response to motor operation.

9 Claims, 13 Drawing Sheets

(56) References Cited

FOREIGN PATENT DOCUMENTS

| | | |
|---|---|---|
| KR | 101126584 B1 | 3/2012 |
| KR | 20140008967 A | 1/2014 |
| KR | 101510684 B1 | 4/2015 |

OTHER PUBLICATIONS

Japanese Notice of Reasons for Refusal issued in Japanese Patent Application No. 2020-121091, dated Jul. 27, 2021, with translation, 10 pages.

\* cited by examiner

CARRIAGE FOR PIPE MACHINING

CROSS-REFERENCE TO RELATED APPLICATION

This present application claims benefit of priority to Korean Patent Application No. 10-2019-0113548, entitled "Carriage For Pipe Machining" filed on Sep. 16, 2019 in the Korean Intellectual Property Office, the entire disclosure of which is incorporated herein by reference.

BACKGROUND

1. Technical Field

The present disclosure relates to a carriage for pipe machining, and more particularly, to a carriage for pipe machining configured such that a distance between drive wheels of the carriage is adjusted according to a diameter of a pipe and a chain coupled to both ends of the carriage to wrapped around outer circumferential surface of the pipe moves along the outer circumferential surface of the pipe along with the carriage.

2. Description of Related Art

A carriage equipped with a machining tool for performing processes such as cutting, welding, beveling, and marking on a pipe machines the pipe while moving along an outer circumferential surface of the pipe. Generally, a rail is mounted along the outer circumferential surface of the pipe, and the carriage moves along the rail. However, since each pipe is different in specification and pipes are rarely formed in a perfectly circular shape, each rail must be formed to fit the shape of the pipe, and it thus takes a long time to mount the rail.

In order to address this, a chain, which may be mounted in close contact with the outer circumferential surface of the pipe regardless of the shape or the specification of the outer circumferential surface, is used to guide movement of the carriage. In this regard, Korean Patent Registration No. 10-1510684 (hereinafter referred to as 'Related Art'), incorporated herein by reference, discloses that a chain is fixedly mounted in such a way as to wrap around the outer circumferential surface of the pipe, and the carriage moves along the chain while coupled with the chain. At this time, since the chain is fixedly mounted so as not to move, it is difficult to smoothly rotate and accurately guide the carriage. As a result, since the carriage machines the pipe while moving irregularly, there is a disadvantage in that the carriage performs machining at a position different from the position of the pipe to be machined. In addition, when using the carriage with a distance between wheels suitable for machining a pipe with a large diameter to machine a pipe with a small diameter so as to stably position the carriage on the outer circumferential surface of the pipe according to the specification of the pipe, since the wheel on one side is not positioned on the pipe, there is a disadvantage in that it is difficult to stably move the carriage on pipes having different diameters. In addition, in order for the carriage to move uniformly, a front wheel and a rear wheel must rotate simultaneously. However, since the front wheel and the rear wheel are rotated by their respective motors, even if the motors are operated simultaneously, slipping of the carriage occurs on the outer circumferential surface of the pipe because the front wheel and the rear wheel do not rotate simultaneously.

Although a motor for precisely controlling the wheels to cause the wheels to rotate simultaneously so as to address this disadvantage may be mounted, this is economically disadvantageous due to high cost and complicated structure.

Related Art: Korean Patent Registration No. 10-1510684 ("PIPE WELDING APPARATUS WITH GUIDE CHAIN", Apr. 3, 2015)

SUMMARY OF THE INVENTION

The present disclosure is directed to addressing the above disadvantages. The present disclosure is directed to providing a carriage that is capable of performing machining with high accuracy by preventing the carriage from deviating from the original mounted position by moving a chain along with movement of the carriage.

In addition, the present disclosure is further directed to providing a carriage that is stably mounted on an outer circumferential surface of a pipe to machine the pipe, regardless of a diameter of the pipe, by adjusting a distance between a front drive wheel and a rear drive wheel of the carriage. In addition, the present disclosure is still further directed to preventing the carriage from slipping by mounting a front wheel and a rear wheel to the same shaft such that the front wheel and the rear wheel rotate simultaneously in response to operation of a motor.

Furthermore, the present disclosure is still further directed to providing a carriage for pipe machining capable of maintaining its machining center, regardless of a change in diameter of a pipe, by positioning a machining tool mounted to the carriage in an imaginary line connecting a center of a front wheel and a center of a pipe.

A carriage for pipe machining according to embodiments of the present disclosure includes: a traveling unit equipped with a machining tool for machining a pipe, wherein the traveling unit is configured to travel along an outer circumferential surface of the pipe; and a roller chain coupled to the traveling unit to wrap around the outer circumferential surface of the pipe, wherein the roller chain is configured to guide the traveling unit to travel along the outer circumferential surface of the pipe, wherein the roller chain is configured to cause both ends of the roller chain to be coupled to the traveling unit, cause a plurality of unit roller chains to be coupled to each other in succession so as to extend in a longitudinal direction of the roller chain, and cause a roller mounted in each of the unit roller chains to rotate on the outer circumferential surface of the pipe.

In addition, the traveling unit includes a body, and a front wheel and a rear wheel that are mounted to a lower portion of the body to roll while in contact with the outer circumferential surface of the pipe, wherein a distance between the front wheel and the rear wheel is adjusted according to a diameter of the pipe.

In addition, the traveling unit further includes: a drive worm screw extending in a longitudinal direction of the body, wherein the drive worm screw is configured to rotate through power received from a motor; a front wheel drive gear meshing with a screw thread formed in the drive worm screw so as to rotate through rotation of the drive worm screw; and a rear wheel drive gear meshing with the screw thread formed in the drive worm screw so as to rotate through rotation of the drive worm screw, wherein the front wheel is coupled to the front wheel drive gear and the rear wheel is coupled to the rear wheel drive gear, such that in response to rotation of the drive worm screw, the front wheel and the rear wheel rotate simultaneously.

In addition, the rear wheel drive gear is configured to move linearly along the screw thread of the drive worm screw by external manipulation, and the rear wheel is configured to adjust the distance between the front wheel and the rear wheel through linear movement of the rear wheel drive gear.

In addition, the traveling unit further includes: a hook mounted on one side of the body to be coupled to one end of the roller chain; a hook guide configured to guide the hook to move from one side of the body to the other side of the body; and a tension adjustment portion comprising hook wheels that are mounted on both sides of the hook to assist movement of the hook in contact with the hook guide, and the carriage for pipe machining further includes a chain auxiliary support portion mounted on one side of the body to support the other end of the roller chain coupled to the hook.

In addition, the traveling unit further includes: a latching portion mounted on the other side of the body to be coupled to the other end of the roller chain; and a tilt adjustment portion mounted on the back of the latching portion, wherein the tilt adjustment portion is configured to adjust a tilt of the latching portion such that the roller chain coupled to the latching portion is level with the pipe.

In addition, the traveling unit further includes a tilt adjustment portion configured to adjust a tilt such that the front wheel and the rear wheel are level with the pipe.

In addition, the machining tool for machining the pipe is mounted in front of the front wheel, and is positioned in an imaginary line connecting a center of the front wheel and a center of the pipe.

In addition, a mounting tilt of the machining tool is adjusted to correspond to the imaginary line that varies according to the diameter of the pipe and the distance between the front wheel and the rear wheel.

In addition, the carriage for pipe machining further includes: a machining tool mounted in the traveling unit, wherein the machining tool is configured to machine the pipe; and a machining tool coupling portion coupled to the machining tool, wherein the machining tool coupling portion is configured to guide forward and backward movement, vertical movement, and tilt adjustment of the machining tool.

The carriage for pipe machining having the above configurations according to the embodiments of the present disclosure can provide a carriage that is capable of performing machining with high accuracy by preventing the carriage from deviating from the original mounted position by moving the chain along with movement of the carriage.

In addition, the carriage for pipe machining according to the embodiments of the present disclosure can provide a carriage that is stably mounted on an outer circumferential surface of a pipe and is capable of machining the pipe, regardless of a diameter of the pipe, by mounting the drive wheels of the carriage to move forward or backward. In addition, the carriage for pipe machining according to the embodiments of the present disclosure can prevent the carriage from slipping by positioning a front wheel and a rear wheel on the same shaft such that in response to operation of a motor, the front wheel and the rear wheel rotate simultaneously.

Furthermore, the carriage for pipe machining according to the embodiments of the present disclosure can cause a machining tool mounted in the carriage to stably machine a pipe, regardless of the shape of the pipe, by positioning the machining tool in an imaginary line connecting a center of a front wheel and a center of the pipe.

DETAILED DESCRIPTION

Hereinafter, the embodiments of the present disclosure as described above will be described in detail with reference to the accompanying drawings.

Figure 1:
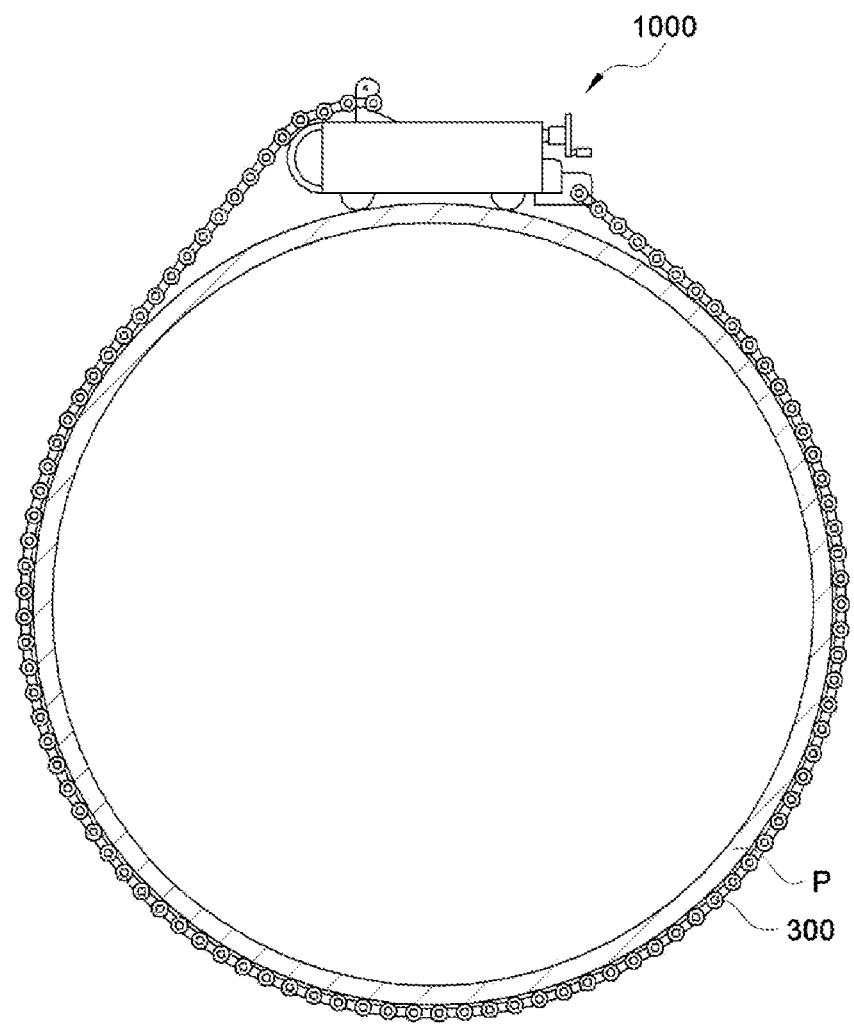
FIG. 1 is a front view of a carriage for pipe machining according to an embodiment of the present disclosure.

FIG. 1 is a front view of a carriage for pipe machining 1000 according to an embodiment of the present disclosure. As illustrated in FIG. 1, a traveling unit 100 traveling along an outer circumferential surface of a pipe P is positioned on the pipe P, and a roller chain 300 is coupled to both ends of the traveling unit 100 such that the roller chain 300 wraps around the outer circumferential surface of the pipe P. The roller chain 300 is formed by combining or separating a plurality of unit roller chains along the outer circumferential surface of the pipe, and a roller is rotatably mounted in each of the unit roller chains.

In the existing art, the length of the chain is approximately the sum of the length of the pipe and the perimeter length of the carriage, the chain is fixed by mounting the carriage between the pipe and the chain, and the carriage moves along the chain. However, in the traveling unit 100 according to the embodiments of the present disclosure, the traveling unit 100 and the roller chain 300 may move together along the outer circumferential surface of the pipe P by coupling the roller chain 300 to both ends of the traveling unit 100. As a result, while there are cases involving the existing art where the chain deviates from the original mounted position due to movement of the carriage, since the traveling unit 100 according to the embodiments of the present disclosure travels together with the roller chain 300, the position of the roller chain 300 may be aligned and moved along a preset position, thereby improving the machining accuracy of the pipe P.

The configuration of the traveling unit 100 according to the embodiments of the present disclosure will be described in more detail below.

Figure 2A:
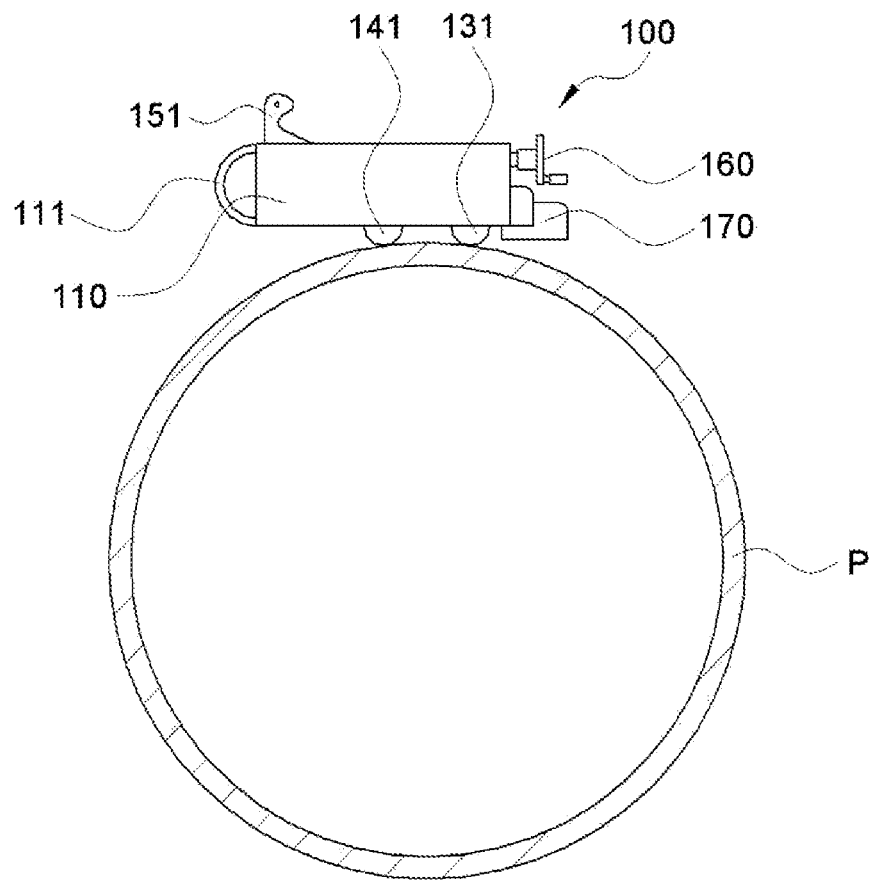
FIGS. 2A and 2B are front views of a carriage for pipe machining according to an embodiment of the present disclosure.
Figure 2B:
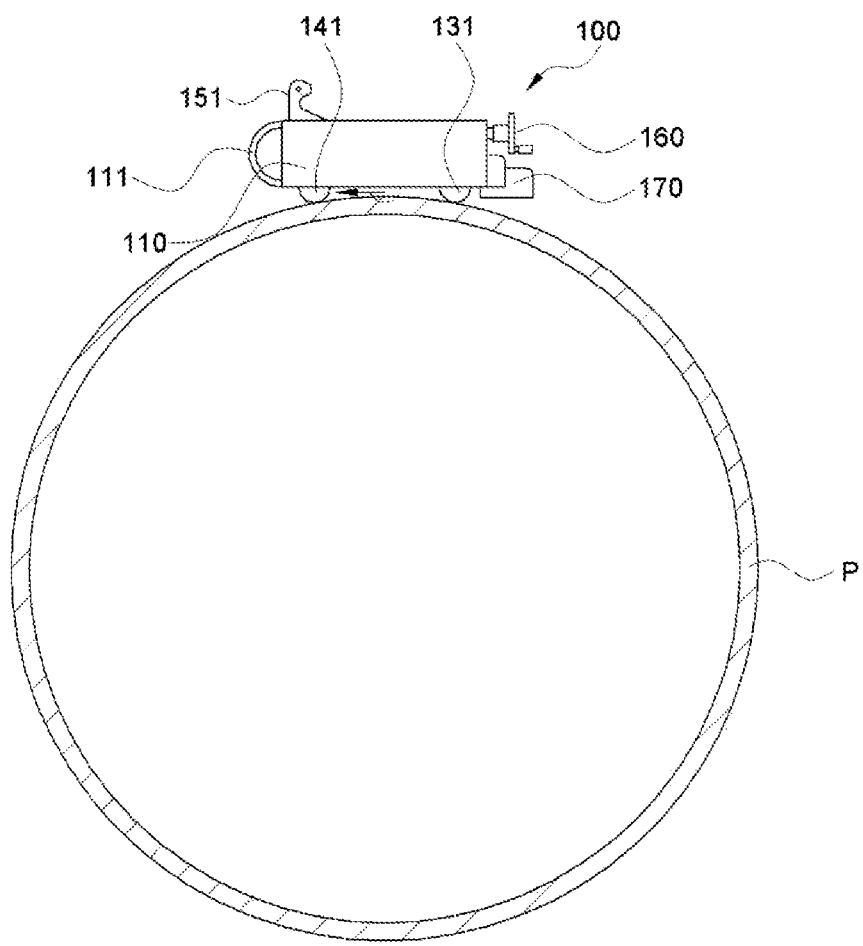

FIGS. 2A and 2B are front views of the carriage for pipe machining according to an embodiment of the present disclosure. The diameter of the pipe illustrated in FIG. 2B is larger than the diameter of the pipe illustrated in FIG. 2A. Wheels are movably mounted to a lower portion of the traveling unit 100, and the wheel positioned on the left of the traveling unit 100 is referred to as a front wheel 131 and the wheel positioned on the right of the traveling unit 100 is referred to as a rear wheel 141. In FIG. 2A, the traveling unit 100 having a short distance between the front wheel 131 and the rear wheel 141 is positioned on the pipe P. In FIG. 2B, the rear wheel 141 is moved to the left on the pipe P such that a distance between the front wheel 131 and the rear wheel 141 is increased.

This is for adjusting the distance between the front wheel 131 and the rear wheel 141 such that the traveling unit 100 is stably positioned on the pipe P according to the diameter of the pipe P. That is, when the diameter of the pipe P is small, the distance between the front wheel 131 and the rear wheel 141 is reduced, and when the diameter of the pipe P is large, the distance between the front wheel 131 and the rear wheel 141 is increased, thereby allowing the traveling unit 100 to be stably positioned and travel the on the pipe P.

Figure 3:
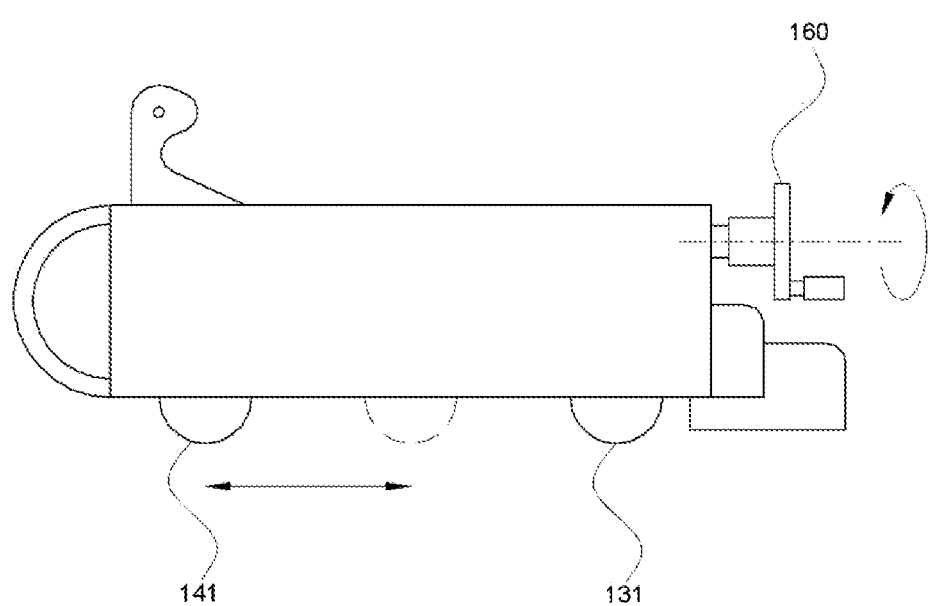
FIG. 3 is a front view of a carriage for pipe machining according to an embodiment of the present disclosure.

FIG. 3 is a front view of the carriage for pipe machining according to an embodiment of the present disclosure. As illustrated in FIG. 3, one side of the traveling unit 100 is provided with a handle 160. The rear wheel 141 may be moved forward or backward through manipulation of the handle 160, and the distance between the front wheel 131 and the rear wheel 141 may be automatically adjusted through a position detection sensor mounted separately on the rear wheel 141. At this time, the handle is preferably positioned in front of the traveling unit 100 so as not to interfere with movement of a machining tool 200 or the traveling unit 100 and the roller chain 300.

Figure 4:
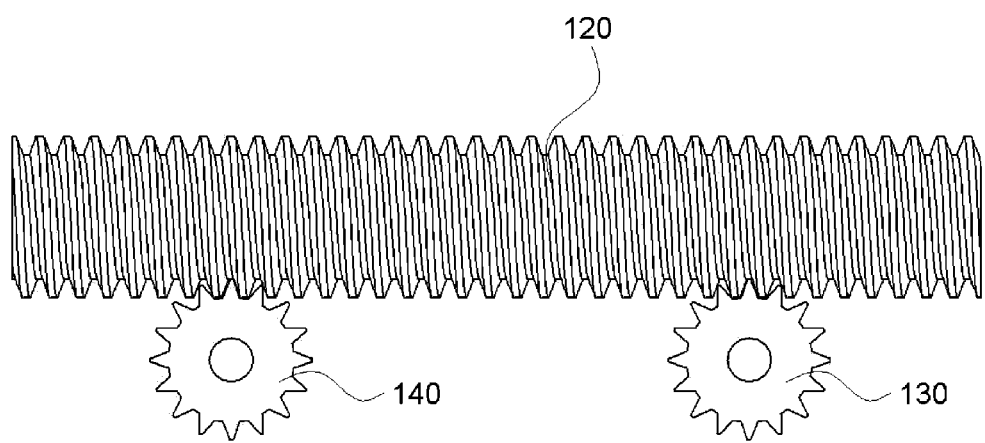
FIG. 4 is a cross-sectional view of a worm screw and wheel drive gears of a carriage for pipe machining according to an embodiment of the present disclosure.

FIG. 4 is a cross-sectional view of a worm screw and wheel drive gears of the carriage for pipe machining according to an embodiment of the present disclosure. As illustrated in FIG. 4, the drive worm screw 120 extends in the longitudinal direction by a predetermined length. A front wheel drive gear 130 and a rear wheel drive gear 140 are mounted beneath the drive worm screw 120 to mesh with the drive worm screw 120, such that they rotate in response to operation of the drive worm screw 120.

The front wheel drive gear 130 is provided with a hole through which a shaft may be coupled to the front wheel drive gear 130. The front wheel 131 is coupled to both ends of the coupled shaft such that the traveling unit 100 travels by rotating the front wheel 131 through rotation of the front wheel drive gear 130. The rear wheel drive gear 140 is also provided with a hole through which the shaft may be coupled to the rear wheel drive gear 140. The rear wheel 141 is coupled to both ends of the coupled shaft such that the traveling unit 100 travels by rotating the rear wheel 141 through rotation of the rear wheel drive gear 140. Since the front wheel drive gear 130 and the rear wheel drive gear 140 rotate simultaneously through rotation of the drive worm screw 120, the front wheel 131 and the rear wheel 141 also rotate simultaneously. Since the front wheel 131 and the rear wheel 141 rotate simultaneously, slipping of the traveling unit 100 does not occur on the pipe P when the traveling unit 100 travels, thereby improving the machining accuracy of the pipe P.

In addition, as described above, when moving the rear wheel 141 forward or backward by using, for example, manipulation the handle 160 or a position detection sensor mounted on the rear wheel 141, since the distance between the front wheel 131 and the rear wheel 141 is adjusted by moving the rear wheel drive gear 140 along a screw thread of the drive worm screw 120, it is possible to precisely adjust the distance.

Although it is possible to connect the front wheel to the rear wheel by using the chain, when the distance between the front wheel and the rear wheel is reduced, there is an inconvenience in that the chain must be de-assembled and then re-assembled in order to adjust the remaining length of chain, and there is a disadvantage in that components must be mounted to tension the chain such that the chain has tension.

Figure 5:
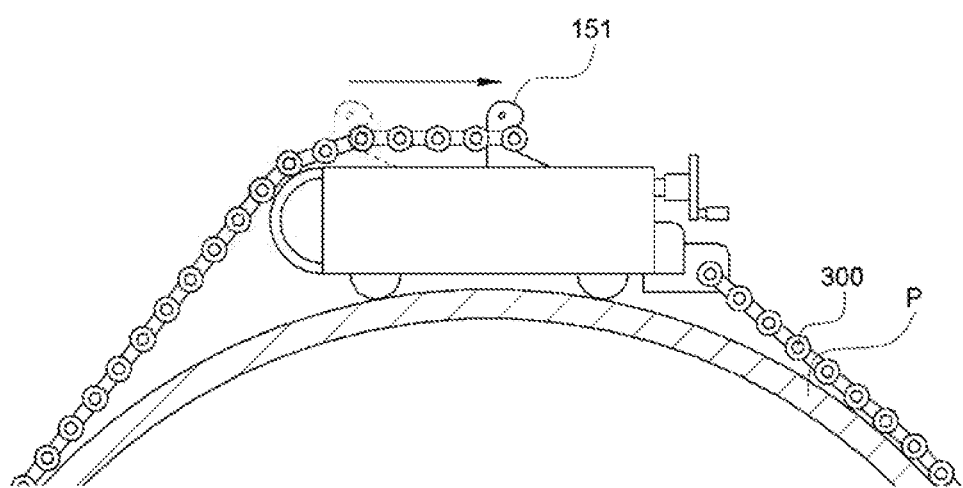
FIG. 5 is a front view of a tension adjustment portion of a carriage for pipe machining according to an embodiment of the present disclosure.

FIG. 5 is a front view of a tension adjustment portion of the carriage for pipe machining according to an embodiment of the present disclosure. The roller chain 300 is first coupled to a chain locking portion 170 mounted at one end of the traveling unit 100, is then wrapped around the outer circumferential surface of the pipe P, and is finally coupled to a hook 151 mounted at the other end of the traveling unit 100. Since the hook 151 is mounted to move linearly, the hook 151 moves toward the chain latching portion 170 after the roller chain 300 is coupled to the hook 151, such that the roller chain 300 is tensioned so as not to deviate from the pipe P.

A tension adjustment portion 150 including the hook 151 will be described below in more detail with reference to FIGS. 6A-6C.

Figure 6A:
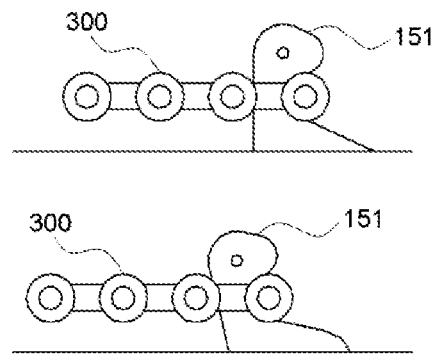
FIGS. 6A-6c illustrate front and rear views of a tension adjustment portion of a carriage for pipe machining according to an embodiment of the present disclosure.
Figure 6B:
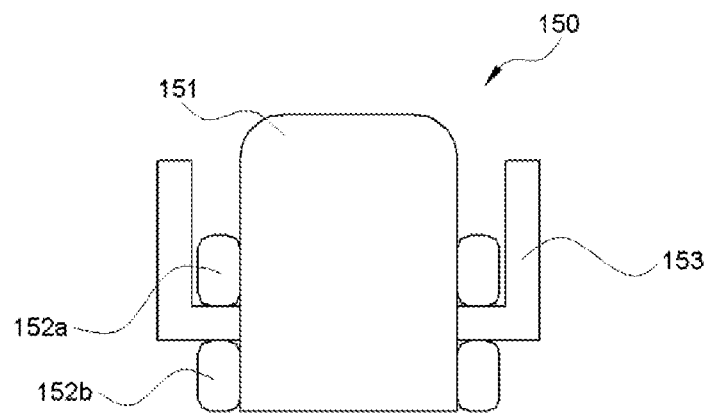
Figure 6C:
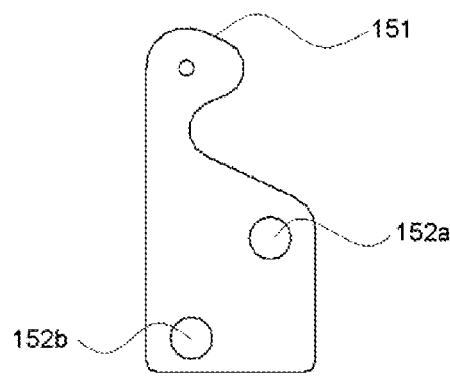

FIGS. 6A-6C illustrate front and rear views of the tension adjustment portion of the carriage for pipe machining according to an embodiment of the present disclosure. As illustrated in FIG. 6A, when moving the hook 151 toward the right after the roller chain 300 is latched to the hook 151, the hook 151 may be tilted according to the degree of tension of the roller chain 300. To address this, referring to the rear view of FIG. 6B, hook wheels 152 are formed on both sides of the hook 151. The hook wheels 152 are spaced apart from each other vertically by a predetermined distance, and a hook guide 153 for guiding linear movement of the hook 151 is mounted in the space between the hook wheels 152. That is, the tension adjustment portion 150 for adjusting the tension of the roller chain 300 includes the hook 151 coupled to the roller chain 300, the hook guide 153 for guiding linear movement of the hook 151, and the hook wheel 152 for preventing the hook 151 from tilting according to the degree of tension of the roller chain 300 when the hook 151 moves linearly. The hook 151 may stably move linearly, without being tilted, by the first hook wheel 152 contacting a top surface of the hook guide 153 and the second hook wheel 152 contacting the bottom surface of the hook guide 153. As illustrated in FIG. 6C, it is desirable to prevent the center of gravity of the hook 151 from being concentrated on a specific portion by mounting the first hook wheel 152 in the front and the second hook wheel 152 in the rear.

Figure 7:
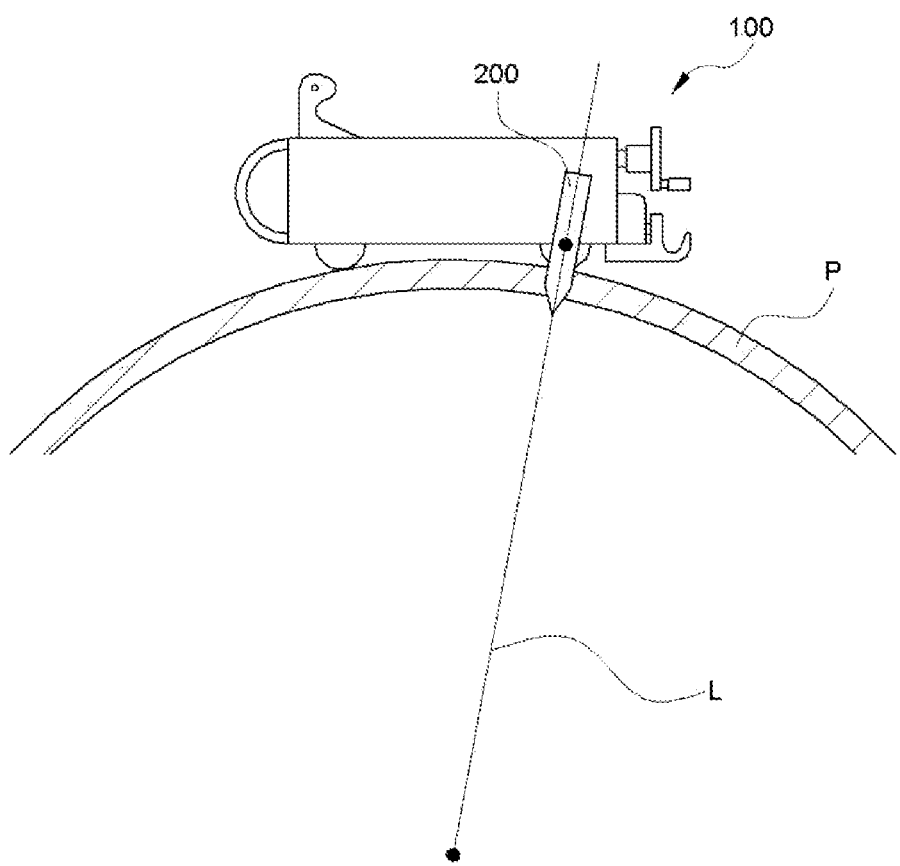
FIG. 7 is a front view of a carriage for pipe machining according to a variation of an embodiment of the present disclosure.

FIG. 7 is a front view of the carriage for pipe machining according to a variation of an embodiment of the present disclosure. As illustrated in FIG. 7, the machining tool 200 is mounted in the traveling unit 100. The machining tool for machining the pipe includes, for example, a welding device for welding the pipe, a cutting and beveling device for cutting the pipe, and a polishing device for polishing a surface of the pipe. At this time, the machining tool 200 is preferably mounted at the position of the front wheel 131. It is desirable to mount the machining tool 200 at the position of the front wheel 131 in order to allow the machining tool 200 to machine the pipe P in contact with the pipe P while moving together with the front wheel 131. The reason for this is that the rear wheel 141 is mounted to move linearly as described above and thus may adversely affect operation of the machining tool 200, and that when the machining tool 200 is mounted at the rear wheel 141 or between the front wheel 131 and the rear wheel 141, there may be un-machined or over-machined portions according to a circularity of the pipe P.

In addition, it is preferable that the machining tool 200 has a tilt of a predetermined angle. In addition, it is preferable that the machining tool 200 has a tilt corresponding to an imaginary line connecting a center of the front wheel 131 and a center of the pipe P. Although the pipe P is illustrated in a perfectly circular shape in some of the drawings, since most pipes P are formed in an elliptical shape and there are often cases where pipes P having a flexure are machined, the machining tool 200 may stably machine the pipe P by controlling the machining tool 200 to have a tilt of a predetermined angle toward the center of the pipe P according to the type of the pipe P.

Figure 8A:
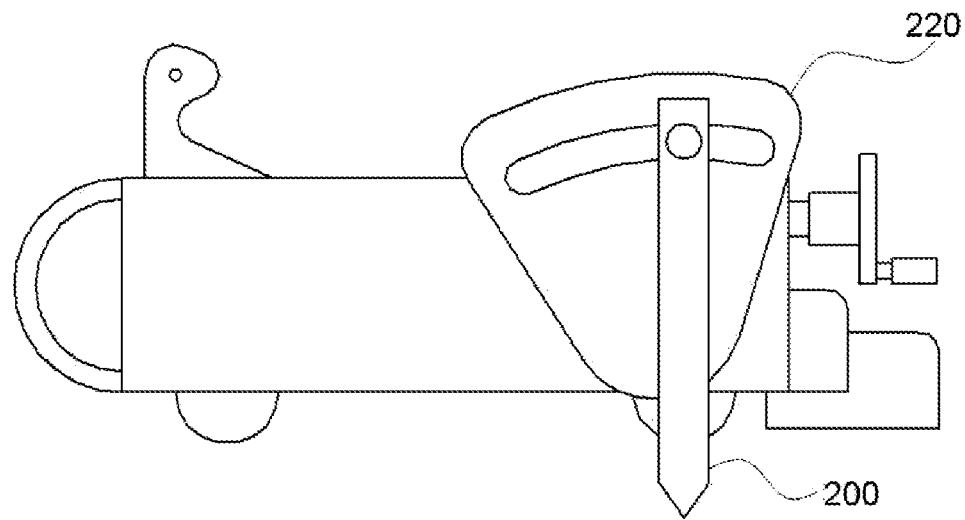
FIGS. 8A and 8B are front views of a carriage for pipe machining according to a variation of an embodiment of the present disclosure.
Figure 8B:
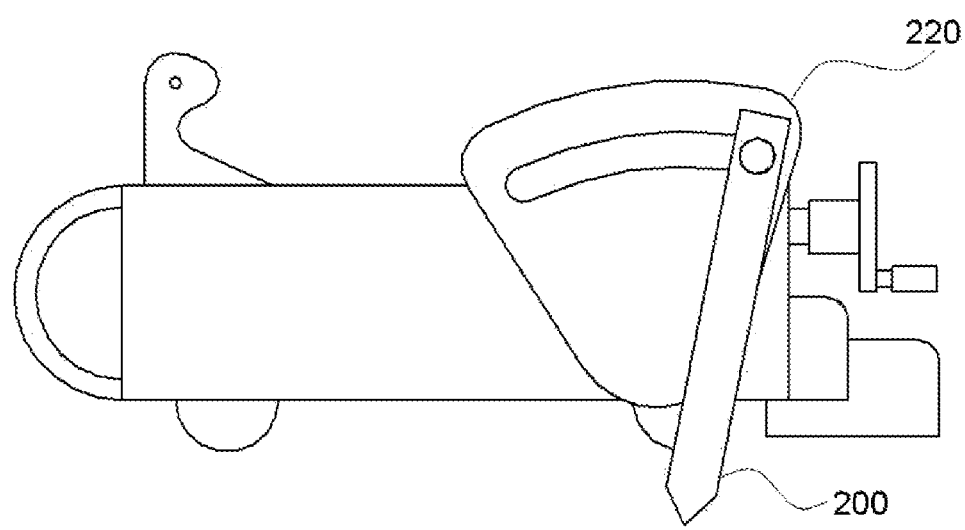

FIGS. 8A and 8B are front views of the carriage for pipe machining according to a variation of an embodiment of the present disclosure. As illustrated in FIGS. 8A and 8B, the machining tool 200 is coupled to a machining tool guide 220 that controls the angle of the machining tool 200. A hole for coupling the machining tool 200 to the machining tool guide 220 is formed in the longitudinal direction of the machining tool guide 220, and the angle of the machining tool 200 is adjusted by moving the machining tool 200 along the hole. At this time, the machining tool guide 220 and the shape of the hole formed in the machining tool guide 220 may be formed differently according to the adjustment range of the machining tool 200.

Figure 9:
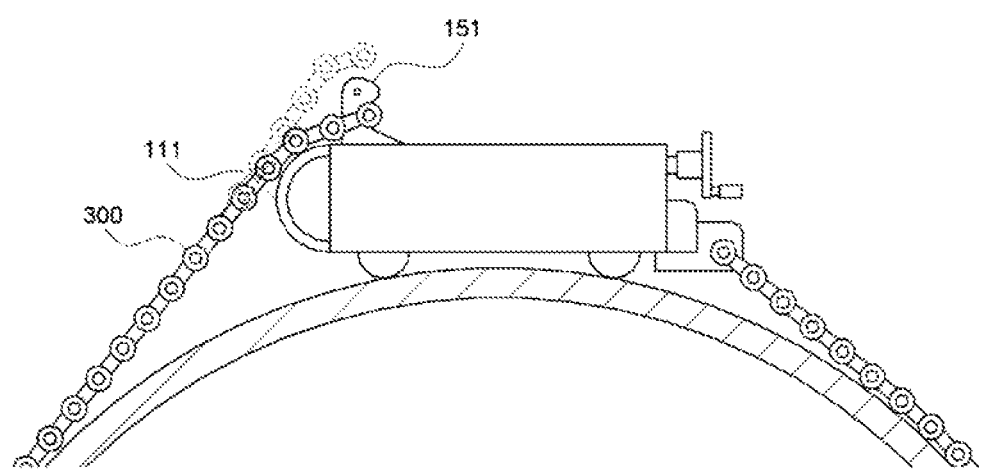
FIG. 9 is a front view of a chain support portion of a carriage for pipe machining according to an embodiment of the present disclosure.

FIG. 9 is a front view of a chain support portion of the carriage for pipe machining according to an embodiment of the present disclosure. As illustrated in FIG. 9, a chain auxiliary support portion 111 is formed at the rear of the traveling unit 100, and the outer surface of the chain auxiliary support portion 111 is formed as a curved surface. The chain auxiliary support portion 111 may reduce the force applied to the hook 151 by supporting the roller chain 300 when the roller chain 300 is latched to the hook 151. When there is no chain auxiliary support portion 111, the roller chain 300 moves in the height direction of the traveling unit 100 while wrapping around the curved pipe P, and then is latched to the hook 151. The hook 151 needs a strong force to prevent deviation of the roller chain 300, and also needs a strong force when moving to the right so as to adjust the tension. However, in the traveling unit 100 according to the embodiments of the present disclosure, since the chain auxiliary support portion 111 supports a part of the roller chain 300, the roller chain 300 is stably positioned on the hook 151. In addition, since the chain auxiliary support 111 may also perform a function of guiding the roller chain 300 through a groove formed in its outer surface, it is easy to adjust the tension of the roller chain 300 by smoothly moving the hook 151 to the right.

Figure 10:
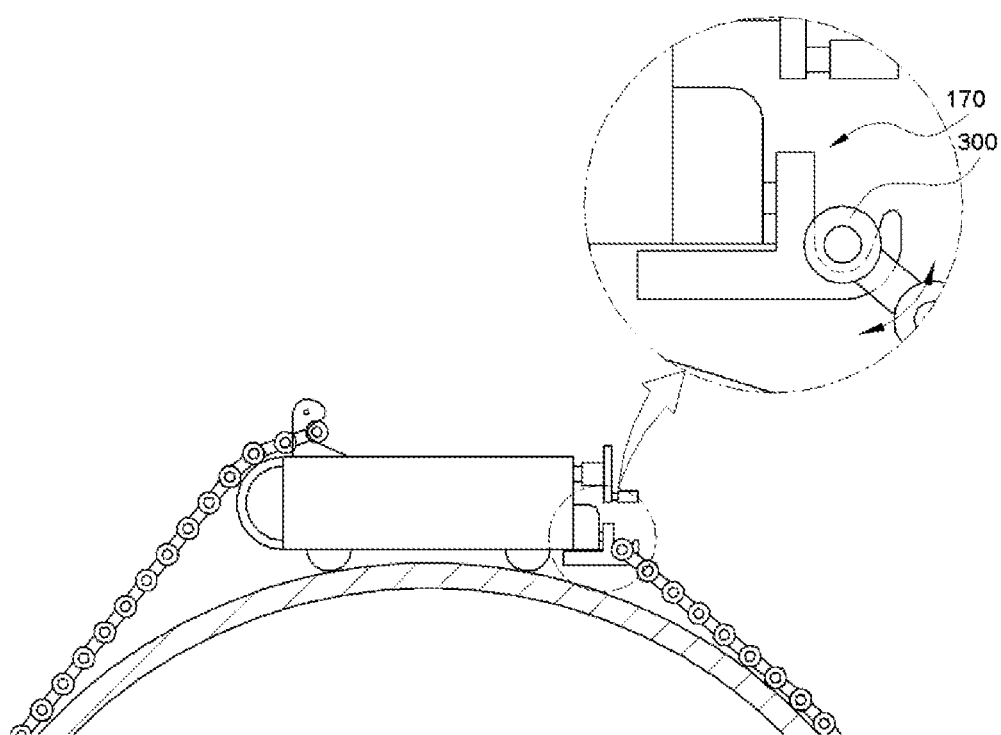
FIG. 10 is an enlarged front view of a chain latching portion of a carriage for pipe machining according to an embodiment of the present disclosure.

FIG. 10 is an enlarged front view of a chain latching portion of the carriage for pipe machining according to an embodiment of the present disclosure. The chain latching portion 170, which is mounted in front of the traveling unit 100 and is coupled to the roller chain 300, includes a hook-shaped latching portion to which the roller chain 300 is coupled, as shown in FIG. 10, and the chain latching portion 170 is coupled to the traveling unit 100 through a pin mounted on the rear side of the chain latching portion 170. Since one end of the roller chain 300 must be latched to the chain latching portion 170 so as to be parallel to the pipe P, it is preferable that the chain latching portion 170 is hinged to the pin to adjust its tilt. That is, after leveling one end of the roller chain 300 and the pipe P by adjusting the tilt of the chain latching portion 170, the chain latching portion 170 is fixed by using a bolt, and the roller chain 300 is wrapped around the outer circumferential surface of the pipe P and is then coupled to the hook 151 of the traveling unit 100.

Figure 11A:
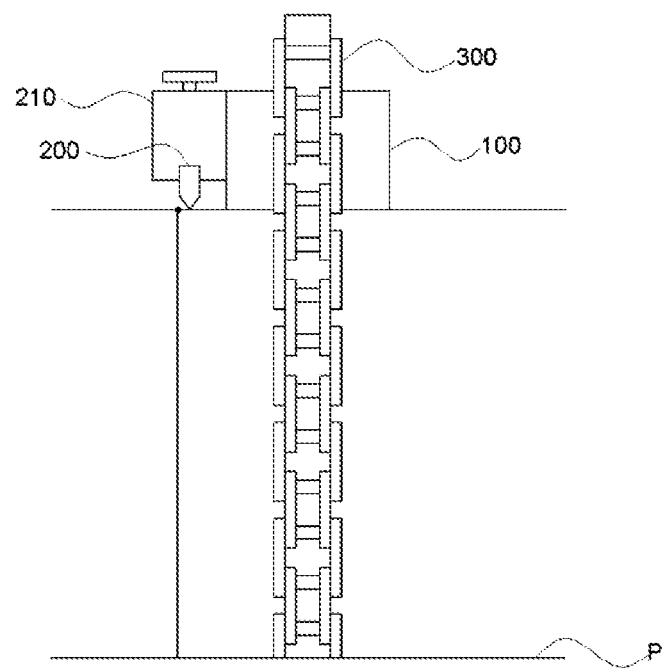
FIGS. 11A-11B are side views of a carriage for pipe machining according to still another variation of an embodiment of the present disclosure.
Figure 11B:
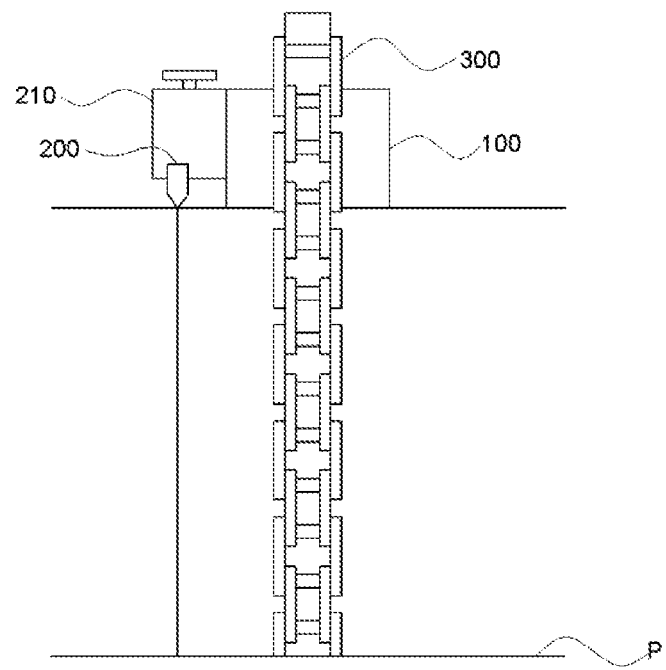

FIGS. 11A-11C are side views of the carriage for pipe machining according to still another variation of an embodiment of the present disclosure. The traveling unit 100 is mounted on the pipe P, and the roller chain 300 is also mounted to wrapped around the outer circumferential surface of the pipe P. A machining tool coupling portion 210 to which the machining tool 200 is coupled is mounted on a front surface of the traveling unit 100. The machining tool 200 coupled to the machining tool coupling portion 210 is, for example, a welding device for performing a welding process, a cutting device for performing a cutting process, a grinding device for performing a grinding process, and a marking device for performing a marking process, which may be selected by an operator according to the type of process. When mounting, for example, the traveling unit 100, the roller chain 300, and the machining tool 200 on the pipe P and then starting machining, there may be a small error between the machined position on the pipe P and the mounted position of the machining tool 200, as shown in FIG. 11A. In the existing art, there is an inconvenience in that the chain must be decoupled from the carriage and then coupled to carriage again in order to position the machining tool 200 at the machined position on the pipe P. However, as illustrated in FIG. 11B, in the embodiments of the present disclosure, since the machining tool 200 moves forward along a guide formed in the machining tool coupling portion 210, the machining tool 200 may be positioned at the machined position on the pipe P.

Figure 12A:
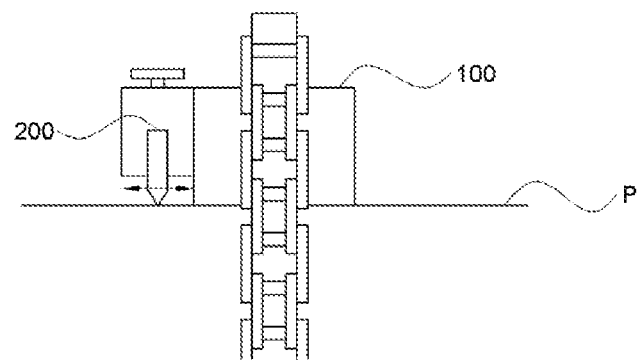
FIGS. 12A-12C are side views of a carriage for pipe machining according to still another variation of an embodiment of the present disclosure.
Figure 12B:
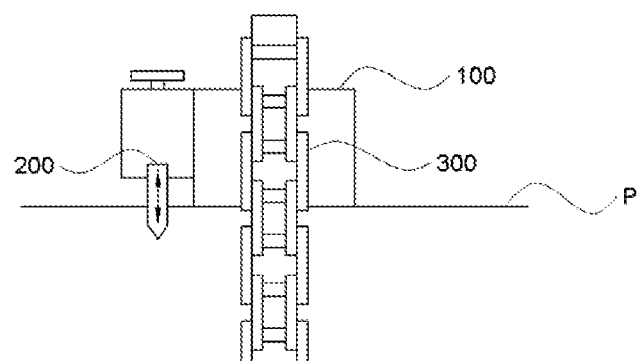
Figure 12C:
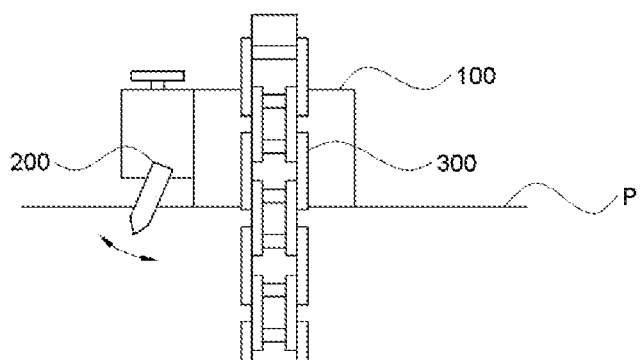

FIGS. 12A-12C are side views of the carriage for pipe machining according to still another variation of an embodiment of the present disclosure. As illustrated in FIG. 12A, the machining tool 200 may move forward or backward. When there is an error between the machined position on the pipe P and the mounted position of the machining tool 200 as described above, the machining tool 200 may be positioned at the machined position by moving the machining tool 200 forward or backward. For example, in the case of the welding process, since a weaving welding method of welding while moving a welding rod from side to side with respect to a welding progress direction is performed, the machining tool 200 must continuously move forward and backward.

In addition, as illustrated in FIG. 12B, the machining tool 200 may be vertically adjusted. This vertical adjustment of the machining tool 200 may depend on a depth of a groove when generating the groove on the outer surface of the pipe P, and may maintain the distance between the pipe P and the welding rod during the welding process as described above.

Finally, as illustrated in FIG. 12C, the machining tool 200 may be mounted such that its tilt is adjustable. The tilt of the machining tool 200 described above with reference to FIGS. 7 and 8A-8B is the tilt relative to the vertical direction of the ground, and the tilt of the machining tool 200 illustrated in FIG. 12C is the tilt relative to the horizontal direction of the ground. Assuming that the machining tool 200 is a cutting tip, when the cutting tip cuts the pipe P at a predetermined angle of tilt, the pipe P may be cut to have a chamfered cutting surface, and the tilt of the machining tool 200 may be adjusted according to the angle of the chamfer.

It should not be construed that the technical spirit of the present disclosure is limited to the above-described embodiments. The present disclosure can be applied to various fields, and various other modifications can be made by those skilled in the art without departing from claimed subject matter. Accordingly, such improvements and modifications apparent to those skilled in the art fall within the protection scope of the present invention.

DESCRIPTION OF SYMBOLS

100: traveling unit
110: body
111: chain auxiliary support portion
120: drive worm screw
130: front wheel drive gear
131: front wheel
140: rear wheel drive gear
141: rear wheel
150: tension adjustment portion
151: hook
152: hook wheel
153: hook guide
160: handle
170: chain locking portion
200: machining tool
210: machining tool coupling portion
220: machining tool guide
300: roller chain

What is claimed is:

1. A carriage for pipe machining, comprising:
 a traveling unit equipped with a machining tool for machining a pipe, wherein the traveling unit is configured to travel along an outer circumferential surface of the pipe;
 the traveling unit comprising:
   a body; and
   a front wheel and a rear wheel that are mounted to a lower portion of the body to roll while in contact with the outer circumferential surface of the pipe; and
 a roller chain coupled to the traveling unit to wrap around the outer circumferential surface of the pipe, wherein the roller chain is configured to guide the traveling unit to travel along the outer circumferential surface of the pipe,
 wherein the roller chain is configured to:
 couple both ends of the roller chain to the traveling unit;
 couple a plurality of unit roller chains to each other in succession so as to extend in a longitudinal direction of the roller chain; and
 enable a roller mounted in each of the unit roller chains to rotate on the outer circumferential surface of the pipe, and
 wherein the traveling unit is adapted such that a distance between the front wheel and the rear wheel of the traveling unit is adjusted according to a diameter of the pipe.

2. The carriage for pipe machining according to claim 1, wherein the traveling unit further comprises:
 a drive worm screw extending in a longitudinal direction of the body, wherein the drive worm screw is configured to rotate through power received from a motor;
 a front wheel drive gear meshing with a screw thread formed in the drive worm screw so as to rotate through rotation of the drive worm screw; and
 a rear wheel drive gear meshing with the screw thread formed in the drive worm screw so as to rotate through rotation of the drive worm screw,
 wherein the front wheel is coupled to the front wheel drive gear and the rear wheel is coupled to the rear wheel drive gear, such that in response to rotation of the drive worm screw, the front wheel and the rear wheel rotate simultaneously.

3. The carriage for pipe machining according to claim 2, wherein the rear wheel drive gear is configured to move linearly along the screw thread of the drive worm screw by external manipulation, and
 wherein the rear wheel is configured to adjust the distance between the front wheel and the rear wheel through linear movement of the rear wheel drive gear.

4. The carriage for pipe machining according to claim 1, wherein the traveling unit further comprises:
 a hook mounted on one side of the body to be coupled to one end of the roller chain;
 a hook guide configured to guide the hook to move from one side of the body to the other side of the body; and
 a tension adjustment portion comprising hook wheels that are mounted on both sides of the hook to assist movement of the hook in contact with the hook guide, and
 wherein the carriage for pipe machining further comprises a chain auxiliary support portion mounted on one side of the body to support the other end of the roller chain coupled to the hook.

5. The carriage for pipe machining according to claim 4, wherein the traveling unit further comprises:
 a latching portion mounted on the other side of the body to be coupled to the other end of the roller chain; and
 a tilt adjustment portion mounted on the back of the latching portion, wherein the tilt adjustment portion is configured to adjust a tilt of the latching portion such that the roller chain coupled to the latching portion is level with the pipe.

6. The carriage for pipe machining according to claim 1, wherein the traveling unit further comprises a tilt adjustment portion configured to adjust a tilt such that the front wheel and the rear wheel are level with the pipe.

7. The carriage for pipe machining according to claim 1, wherein the machining tool for machining the pipe is mounted in front of the front wheel, and is positioned in an imaginary line connecting a center of the front wheel and a center of the pipe.

8. The carriage for pipe machining according to claim 7, wherein a mounting tilt of the machining tool is adjusted to correspond to the imaginary line that varies according to the diameter of the pipe and the distance between the front wheel and the rear wheel.

9. The carriage for pipe machining according to claim 1, wherein the carriage for pipe machining further comprises:
 a machining tool mounted in the traveling unit, wherein the machining tool is configured to machine the pipe; and
 a machining tool coupling portion coupled to the machining tool, wherein the machining tool coupling portion is configured to guide forward and backward movement, vertical movement, and tilt adjustment of the machining tool.

\* \* \* \* \*